United States Patent
Kim

(10) Patent No.: US 7,589,761 B2
(45) Date of Patent: Sep. 15, 2009

(54) DEVICE AND METHOD FOR TRANSMITTING IMAGE DATA

(75) Inventor: Cheong-Worl Kim, Andong (KR)

(73) Assignee: 4D Culture Inc. (KR)

( * ) Notice: Subject to any disclaimer, the term of this patent is extended or adjusted under 35 U.S.C. 154(b) by 735 days.

(21) Appl. No.: 10/514,391

(22) PCT Filed: Apr. 1, 2003

(86) PCT No.: PCT/KR03/00648

§ 371 (c)(1),
(2), (4) Date: Nov. 15, 2004

(87) PCT Pub. No.: WO03/096120

PCT Pub. Date: Nov. 20, 2003

(65) Prior Publication Data

US 2005/0225569 A1    Oct. 13, 2005

(30) Foreign Application Priority Data

May 14, 2002    (KR)    .................... 10-2002-0026546

(51) Int. Cl.
*H04N 5/232* (2006.01)
*H04N 5/225* (2006.01)

(52) U.S. Cl. ............ 348/211.2; 348/211.1; 348/207.11; 348/207.1

(58) Field of Classification Search ............. 348/207.1, 348/207.11, 211.1, 211.2
See application file for complete search history.

(56) References Cited

U.S. PATENT DOCUMENTS

| | | | | |
|---|---|---|---|---|
| 5,990,900 | A * | 11/1999 | Seago | 345/427 |
| 6,975,350 | B1 * | 12/2005 | Mohammed et al. | 348/207.11 |
| 2001/0045950 | A1 * | 11/2001 | Endo et al. | 345/419 |
| 2004/0240543 | A1 * | 12/2004 | Faroudja | 375/240.01 |

\* cited by examiner

*Primary Examiner*—James M Hannett
(74) *Attorney, Agent, or Firm*—The Farrell Law Firm, LLP

(57) ABSTRACT

Disclosed is a device and method for transmitting image data that converts 2D image data taken by a digital camera to 3D image data and transmits the 2D and 3D image data to a computer. The image data transmission method that converts 2D image data taken by a digital camera to 3D image data and transmits the 2D and 3D image data to a computer, thereby reducing the required memory capacity and hence the image transfer rate includes: extracting contours from the 2D image data taken by the digital camera; and transmitting the contour extraction data to the computer when the extraction of the contours is completed.

4 Claims, 5 Drawing Sheets

PRIOR ART

FIG. 5

| PROFILE(0) | | PROFILE(1) | | ... | PROFILE(1023) | |
|---|---|---|---|---|---|---|
| HEIGHT INFORMATION | GREY INFORMATION | HEIGHT INFORMATION | GREY INFORMATION | | HEIGHT INFORMATION | GREY INFORMATION |

# DEVICE AND METHOD FOR TRANSMITTING IMAGE DATA

TECHNICAL FIELD

The present invention relates to a device and method for transmitting image data and, more particularly, to a device and method for transmitting image data that transmits 2D image data taken by a digital camera to a computer, or converts the 2D image data to 3D image data and then transmits the 3D image data to the computer.

BACKGROUND ART

In general, the images displayed on a computer monitor are 2D motion images and, if 3D images are needed, 2D images taken by a digital camera or a camcorder are transmitted to a computer and converted to 3D images by adding separate 2D images on the computer, thereby displaying 3D images.

FIG. 1 is a schematic of a device for displaying 3D image data according to prior art.

Referring to FIG. 1, the device comprises a digital camera 10 for taking an image of an object to output 2D image data; a frame grabber 12 for converting the 2D image data from the digital camera 10 to 3D image data and displaying the 3D image data; and a signal processor 14 for processing the 3D image data converted from the frame grabber 12 and displaying them on the monitor.

To construct 3D images, however, the conventional image data transmitting device must receive as many 2D image data as the contours of 3D image from the digital camera 10, thus requiring a large memory capacity and taking too much time in transmission of 3D image data.

DISCLOSURE OF THE INVENTION

It is an object of the present invention to a device and method for transmitting image data that transmits 2D image data taken by a digital camera to a computer, or converts the 2D image data to 3D image data and transmits the converted 3D image data to the computer, thereby reducing the required memory capacity and increasing the image transfer rate.

To achieve the objects of the present invention, there is provided a device for transmitting 3D image data that includes: a computer for generating a 2D image signal transmit command or a 3D image signal transmit command by manipulation of keys, receiving 3D image signals and displaying them; a digital camera for taking 2D image signals of an object and converting them to digital image signals; a first-in first-out (FIFO) for storing the 2D digital image signals received from the digital camera in a first-in first-out manner; a digital signal processor for controlling extraction of contours necessary for 3D image signals from the 2D digital image signals output from the FIFO and storage and reading-out of the extracted contours, converting the 2D digital image signals to 3D image signals using the stored contour extraction data, and outputting the 3D image signals as serial data; a memory for storing the position and signal magnitude data of the contours extracted from the digital signal processor; a control and communication logic circuit for receiving the 2D image signal transmit command or the 3D image signal transmit command and a ready command from the computer to output a start command or a stop command to the digital camera, and generating the converted 3D image signals from the digital signal processor; and an input/output buffer for buffering input/output data between the computer and the control and communication logic circuit.

In another aspect of the present invention, there is provided a method for transmitting 3D image data, which is in a device for transmitting 3D image data that has a digital camera, the method including: (a) extracting contours from 2D image data taken by the digital camera; and (b) transmitting the extracted contour data to a computer when the extraction of the contours is completed.

BRIEF DESCRIPTION OF THE DRAWINGS

FIG. 5 is a diagram showing the format of contour extraction data according to the embodiment of the present invention.

BEST MODE FOR CARRYING OUT THE INVENTION

Hereinafter, the present invention will be described in detail by way of the following examples. In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
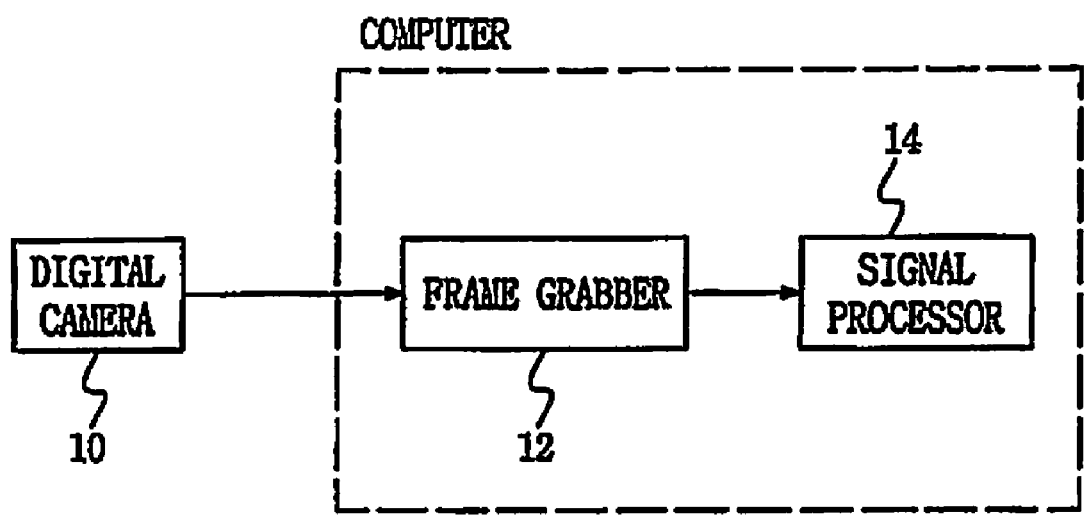
FIG. 1 is a schematic of a device for displaying 3D image data according to prior art.
Figure 2:
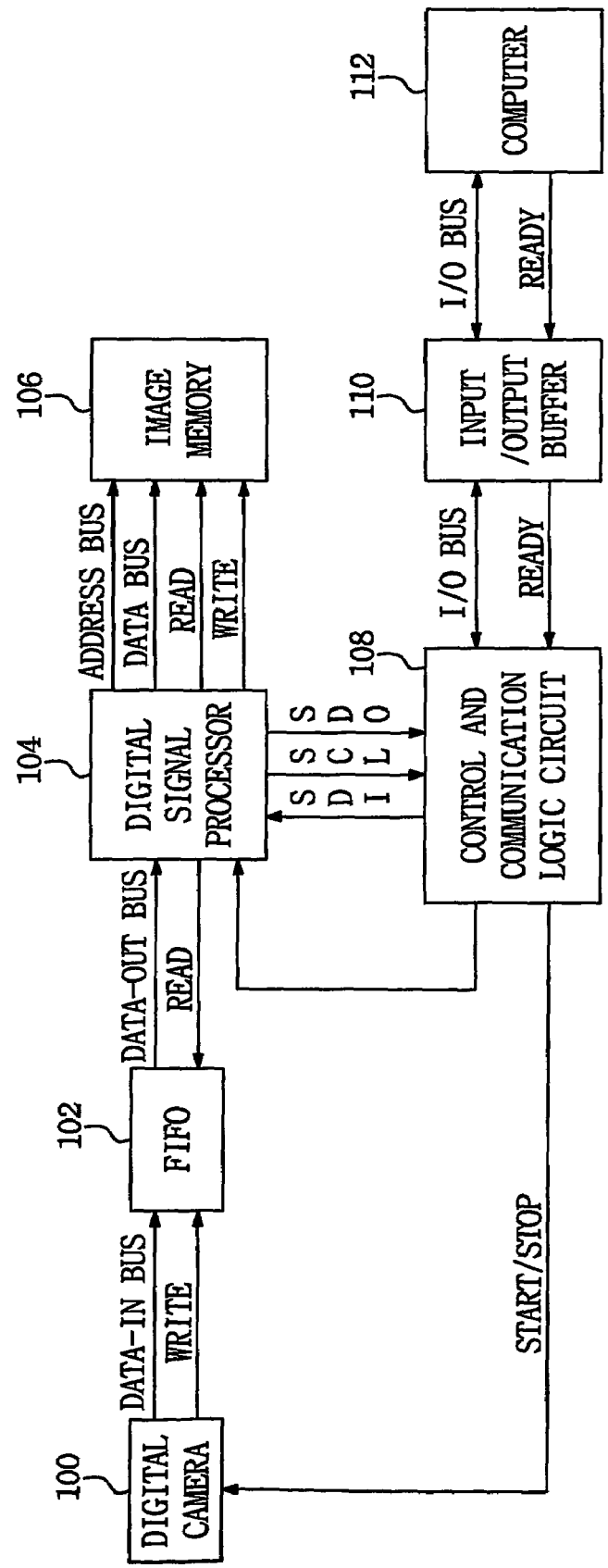
FIG. 2 is a hardware block diagram for the embodiment of the present invention.

FIG. 2 is a hardware block diagram of the embodiment of the present invention.

Referring to FIG. 2, the hardware of the present invention comprises: a computer 112 for generating a 2D image signal transmit command or a 3D image signal transmit command by a manipulation of keys, receiving 3D image signals and displaying them; a first-in first-out (FIFO) 102 for storing 2D digital image signals output from a digital camera 100 in a first-in first-out manner; a digital signal processor (DSP) 104 for controlling extraction of a contour necessary for 3D image signals from the 2D digital image signals output from the FIFO 102 and storage or reading out of the extracted contour, converting the 2D digital image signals to 3D image signals using the stored contour extraction data and then outputting serial data; a image memory 106 for storing the position of the extracted contour received from the digital signal processor 104 and signal magnitude data; a control and communication logic circuit 108 for receiving the 2D image signal transmit command or the 3D image signal transmit command and a ready command from the computer 112, generating a start or stop command to the digital camera 100 and outputting the converted 3D image signals from the digital signal processor 104; and an input/output (I/O) buffer 110 for buffering I/O data between the computer 112 and the control and communication logic circuit 108.

Figure 3:
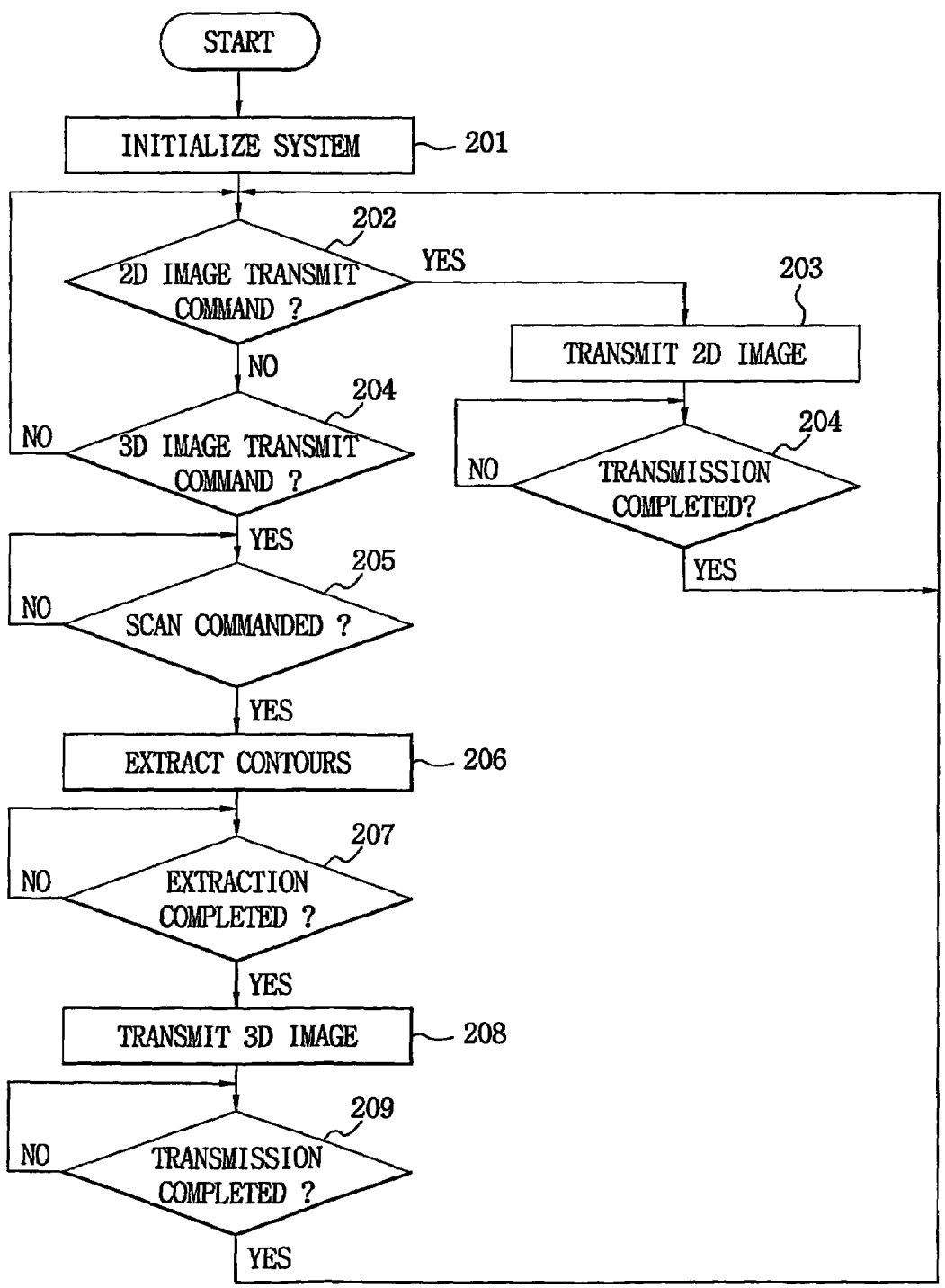
FIG. 3 is a flow chart showing a process for transmitting 3D image signals of a digital signal processor 104 according to the embodiment of the present invention.
Figure 4:
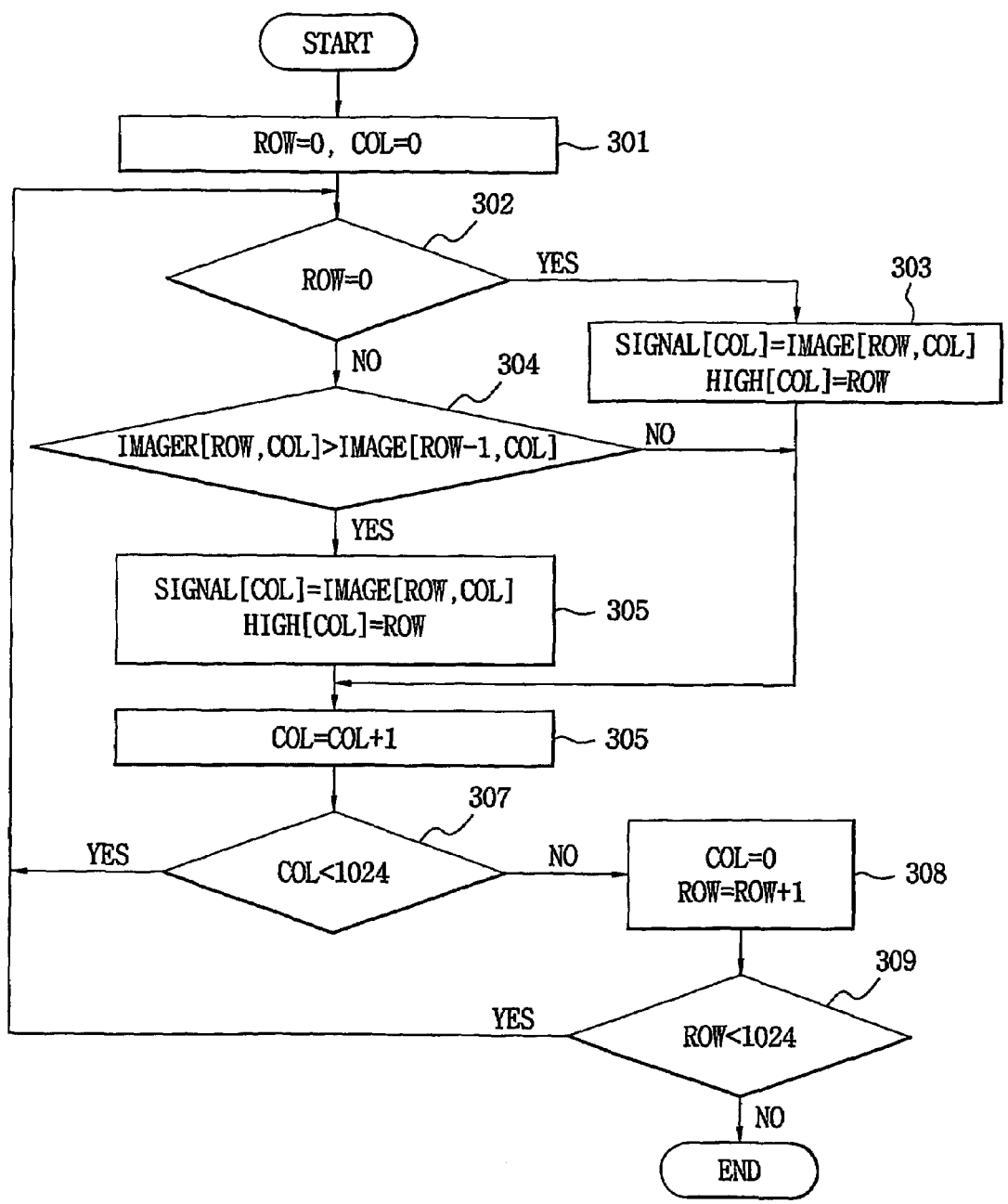
FIG. 4 is a flow chart showing an algorithm for contour extraction according to the embodiment of the present invention.

FIG. 3 is a flow chart showing a process for transmitting 3D image signals of the digital signal processor 104 according to the embodiment of the present invention; FIG. 4 is a flow chart showing an algorithm for contour extraction according to the embodiment of the present invention; and FIG. 5 is a diagram showing the format of contour extraction data according to the embodiment of the present invention.

Below is a detailed description of the operation for transmitting 3D image signals according to the preferred embodiment of the present invention with reference to FIGS. 2 to 5.

As the user manipulates the computer 112 to generate a scan start command, a scan stop command, a 2D image transmit command or a 3D image transmit command, the command is buffered through the I/O buffer 110 and applied to the control and communication logic circuit 108. The control and communication logic circuit 108 sends the start command to the digital camera 100 and the 2D image transmit command or the 3D image transmit command to the digital signal processor 104 through a serial data input (SDI). The digital camera 100 receives the start command to start an object shooting operation and sends 2D image data with a write signal to the FIFO 102, which stores the 2D image data in a first-in first-out manner. The 2D image data output from the digital camera 100 have a grey resolution of 8 bits and a display resolution of 1024×1024 and store image data of 1 Mega byte. Once the 2D image data is stored in the FIFO 102, the digital signal processor 104 processes image signals according to the 2D image transmit command or the 3D image transmit command for transmission of the image signals, which will be described below with reference to FIG. 2.

First, the digital signal processor 104 initializes the system, in step 201, and checks in step 202 whether or not the 2D image transmit command is received from the computer 112 through the control and communication logic circuit 108. If the 2D image transmit command is received, the digital signal processor 104 proceeds to step 203 in which it sends a read signal to the FIFO 102 to read out the stored data, stores the data in the memory 106, synchronizes the stored 2D image data with a serial clock (SCL) and sends them to the control and communication logic circuit 108 through a serial data output (SDO) line. Then the control and communication logic circuit 108 buffers the 2D image data through the I/O buffer 110 via an I/O bus and sends them to the computer 112. The digital signal processor checks in step 204 whether or not an image transmit stop command is received from the computer 112 through the control and communication logic circuit 108. If the image transmit stop command is received, the digital signal processor 104 returns to step 202. If the 2D image transmit command is not received in step 202, the digital signal processor 104 proceeds to step 204 in which it checks whether or not a 3D image transmit command is received from the computer 112 through the control and communication logic circuit 108. If the 3D image transmit command is received, the digital signal processor 104 proceeds to step 205 in which it checks whether or not a scan start command is received through the control and communication logic circuit 108. If the scan start command is received, the digital signal processor 104 proceeds to step 206 in which it sends a read signal to the FIFO 102 to read out the stored 2D image data, extracts a contour necessary for 3D image from the 2D image data and stores the extracted contour in the memory 106. The algorithm for contour extraction is illustrated in FIG. 4 and its operation will be described below with reference to FIG. 4.

In step 301, the digital signal processor 104 sets a row index and a column index at zero in order to acquire a contour height and a signal magnitude from one 2D image data for the first one frame. In step 302, the digital signal processor 104 checks whether or not the low index is zero (ROW=0). If the row index is zero, the digital signal processor 104 substitutes the contour height and the signal magnitude for variables in order to extract the contour height and the signal magnitude of the 2D image data, in step 303. Subsequently, the digital signal processor 104 increases the column index by one (COL=COL +1), in step 306, and checks in step 307 whether or not the column index is less than 1024. If the column index is less than 1024, the digital signal processor 104 returns to step 302.

If the row index is not zero in step 302, the digital signal processor 104 sets the contour height and the signal magnitude and stores the set values in the memory 106, in step 304. Here, High[ ] is the position of the contour and Signal[ ] is the signal magnitude. For example, when High[100]=200 and Signal[100]=127, the $100^{th}$ position of the contour has a height value of 200 and the signal magnitude (potential energy) is 127. In step 305, the digital signal processor 104 checks whether or not the current signal magnitude is greater than the previous one. If the current signal magnitude is greater than the previous one, the digital signal processor 104 substitutes the value of the current signal magnitude for the variable in step 306. The digital signal processor 104 increases the column index by one, in step 307, and checks in step 308 whether or not the column index is 1024. If the column index is not 1024, the digital signal processor 104 returns to step 302. Otherwise if the column index is 1024, the digital signal processor 104 sets the column index at zero and increases the row index by one, in step 309. Subsequently, the digital signal processor 104 checks in step 310 whether or not the row index is 1024. If the row index is not 1024, the digital signal processor 104 returns to step 302. Otherwise if the row index is 1024, the digital signal processor 104 considers that the image signal for one frame is completely processed, and ends the operation for acquiring the contour height and the signal magnitude. This procedure is repeated to convert more than one 2D image signals to 3D image signals.

Following the contour extraction, the digital signal processor 104 checks in step 207 whether or not the extraction of the contour from the 2D image signals for one frame is completed. If the contour extraction is completed, the digital signal processor 104 stores the height information High and the grey information Signal for the contour extraction data in a data format as shown in FIG. 5 in the memory 106 and sends the stored 3D image data to the computer 112 via the control and communication logic circuit 108 and the I/O buffer 110, in step 208. The 3D image data format shown in FIG. 5 has height and grey information and requires, for example, 10 bits for representing the height information and 8 bits for the grey information in the case of 1024×1024 display resolution and 8-bit grey resolution. Accordingly, two bytes for height information and one byte for grey information, i.e., totally three bytes are required for representing one point of the contour and a memory of 3 Kbytes is used for one contour. Subsequently, the digital signal processor 104 checks in step 209 whether or not the transmission of the 3D image data is completed. If the transmission is completed, the digital signal processor 104 returns to step 202 for transmission of another image data.

The 3D image is composed of several contours. When the scanning direction of the digital camera 100 is vertical, the contour has horizontal coordinates and height information and the vertical coordinates are determined by the moving distance of the digital camera 100 the moment the digital camera 100 shoots the 2D image. Since the scanning speed is determined at the time of hardware manufacture, the 2D image taken by the digital camera 100 is converted to a 3D image and sent to the computer 112. Then the computer 112 constructs 3D image data in consideration of the contour information and the moving distance of the camera and displays them.

As described above, following extraction of the contour from the 2D image signals taken by the digital camera 100 and acquisition of the grey level of each extracted point, the contour and the grey signal for each point on the contour rather than the 2D image data are sent to the computer 112. The computer 112 can process the 3D image signals only from the height and grey information of the contour. For example, when the X-directional resolution and the height resolution are both 1024 and the number of contours is 512, the prior art must transmit 512 2D images having a resolution of 1024×1024. If the grey information is eight bits in this case, the data amount to be transmitted is 4 Gbits (=1024×1024× 512×8). However, the present invention, which uses 2 bytes for the height resolution, requires 64 Mbits (=1024×16×512× 8), thus reducing the data amount to $\frac{1}{60}$.

INDUSTRIAL APPLICABILITY

As described above, the present invention transmits 2D image data taken by a digital camera, or converts the 2D image data to 3D image data and then transmits the 3D image data to a computer, according to a 2D image transmit command or a 3D image transmit command received from the computer, thereby increasing the transmission speed and reducing the required time for transmitting the 3D image data. Moreover, the present invention uses a DSP technology to reduce the amount of data for conversion of 2D image data to 3D image data and increase the required memory capacity, thereby decreasing the production cost.

What is claimed is:

1. An image data transmission device, comprising:
   a computer for generating a 2D image signal transmit command or a 3D image signal transmit command by manipulation of keys, receiving 2D or 3D image signals and displaying them;
   a digital camera for taking 2D image signals of an object and converting them to digital image signals;
   a first-in first-out (FIFO) for storing the 2D digital image signals received from the digital camera in a first-in first-out manner;
   a digital signal processor for controlling extraction of contours necessary for 3D image signals from the 2D digital image signals output from the FIFO and storage and reading-out of the extracted contours, converting the 2D digital image signals to 3D image signals using the stored contour extraction data, and outputting the 3D image signals as serial data;
   a memory for storing the position and signal magnitude data of the contours extracted from the digital signal processor;
   a control and communication logic circuit for receiving the 2D image signal transmit command or the 3D image signal transmit command and a ready command from the computer to output a start command or a stop command to the digital camera, and generating the converted 3D image signals from the digital signal processor; and
   an input/output buffer for buffering input/output data between the computer and the control and communication logic circuit.

2. The image data transmission device as claimed in claim 1, wherein the digital camera starts or ends a shooting operation according to the start command or the stop command output from the control and communication logic circuit, respectively.

3. The image data transmission device as claimed in claim 1, wherein the digital camera generates a record control signal and sequentially stores the 2D image signals in the FIFO.

4. The image data transmission device as claimed in claim 2, wherein the digital camera generates a record control signal and sequentially stores the 2D image signals in the FIFO.

* * * * *